US010652338B2

(12) United States Patent
Jolfaei et al.

(10) Patent No.: US 10,652,338 B2
(45) Date of Patent: May 12, 2020

(54) EVENT PROCESSING IN BACKGROUND SERVICES

(71) Applicant: SAP SE, Walldorf (DE)

(72) Inventors: Masoud Aghadavoodi Jolfaei, Wiesloch (DE); Frank Radmacher, Heidelberg (DE); Edgar Lott, Nussloch (DE); Achim Braemer, Heidelberg (DE); Sasan Memar-Zahedani, Bammental (DE); Helmut Prestel, Bad Schoenborn (DE)

(73) Assignee: SAP SE, Walldorf (DE)

( * ) Notice: Subject to any disclaimer, the term of this patent is extended or adjusted under 35 U.S.C. 154(b) by 438 days.

(21) Appl. No.: 15/626,865

(22) Filed: Jun. 19, 2017

(65) Prior Publication Data

US 2018/0367618 A1 Dec. 20, 2018

(51) Int. Cl.
*H04L 29/08* (2006.01)
*H04L 12/24* (2006.01)

(52) U.S. Cl.
CPC .............. *H04L 67/14* (2013.01); *H04L 41/20* (2013.01)

(58) Field of Classification Search
CPC ...... H04L 67/00–67/42; H04L 41/00–41/5096
See application file for complete search history.

(56) References Cited

U.S. PATENT DOCUMENTS

| 7,500,133 | B2 | 3/2009 | Galchev et al. |
| 7,580,915 | B2 | 8/2009 | Braun et al. |
| 7,587,399 | B2 | 9/2009 | Kilian et al. |
| 7,593,930 | B2 | 9/2009 | Braun et al. |
| 7,672,949 | B2 | 3/2010 | Kilian et al. |
| 7,694,065 | B2 | 4/2010 | Petev et al. |
| 7,823,170 | B2 | 10/2010 | Jolfaei et al. |
| 7,933,947 | B2 | 4/2011 | Fleischer et al. |
| 7,945,677 | B2 | 5/2011 | Fleischer et al. |
| 7,966,412 | B2 | 6/2011 | Luik et al. |
| 7,996,615 | B2 | 8/2011 | Galchev et al. |
| 8,051,152 | B2 | 11/2011 | Rehm et al. |
| 8,140,580 | B2 | 3/2012 | Rehm et al. |

(Continued)

OTHER PUBLICATIONS

U.S. Appl. No. 14/495,056, Andrey Engelko et al., filed Sep. 24, 2014.

(Continued)

*Primary Examiner* — Clayton R Williams
(74) *Attorney, Agent, or Firm* — Fish & Richardson P.C.

(57) ABSTRACT

The present disclosure involves systems, software, and computer implemented methods for event processing in background services. One example method includes receiving a request to create a daemon session, the request including at least one parameter. The session is created, including storing the at least one parameter in a memory storage that is configured to survive a restart of the session. A set of messages is received for the session. The messages are stored in a queue that is configured to survive a restart of the session. A determination is made that the session is to be restarted. A restart of the session is initiated, including providing the at least one parameter to the session during the restart of the daemon session and providing unprocessed messages to the session after the session has been restarted, to enable the session to process the unprocessed messages.

20 Claims, 7 Drawing Sheets

(56) References Cited

U.S. PATENT DOCUMENTS

| | | |
|---|---|---|
| 8,140,678 B2 | 3/2012 | Fleischer et al. |
| 8,161,169 B2 | 4/2012 | Fleischer et al. |
| 8,533,717 B2 | 9/2013 | Kilian et al. |
| 8,636,178 B2 | 1/2014 | Jolfaei |
| 8,701,180 B2 | 4/2014 | Jolfaei |
| 8,706,844 B2 | 4/2014 | Jolfaei |
| 8,706,887 B2 | 4/2014 | Jolfaei |
| 8,707,323 B2 | 4/2014 | Galchev et al. |
| 8,826,308 B1 | 9/2014 | Jolfaei et al. |
| 8,843,526 B2 | 9/2014 | Stoeck et al. |
| 9,009,409 B2 | 4/2015 | Galchev et al. |
| 9,043,815 B2 | 5/2015 | Jolfaei et al. |
| 9,191,389 B2 | 11/2015 | Jolfaei |
| 9,219,774 B2 | 12/2015 | Jolfaei |
| 2005/0125557 A1* | 6/2005 | Vasudevan ......... G06F 11/2038 709/239 |
| 2005/0172161 A1* | 8/2005 | Cruz .................. G06F 11/2025 714/4.11 |
| 2006/0224918 A1* | 10/2006 | Koike ................ G06F 11/2097 714/11 |
| 2012/0011515 A1 | 1/2012 | Jolfaei et al. |
| 2013/0191882 A1 | 7/2013 | Jolfaei |
| 2013/0238555 A1 | 9/2013 | Driesen et al. |
| 2013/0238868 A1 | 9/2013 | Driesen et al. |
| 2013/0246714 A1* | 9/2013 | Lv ......................... G06F 9/466 711/147 |
| 2013/0282154 A1* | 10/2013 | Chappell ............... G05B 15/02 700/90 |
| 2014/0180737 A1 | 6/2014 | Acker et al. |
| 2015/0106140 A1 | 4/2015 | Biewald et al. |

OTHER PUBLICATIONS

U.S. Appl. No. 14/981,137, Konrad et al., filed Dec. 28, 2015.
U.S. Appl. no. 15/078,382, Jolfaei et al., filed Mar. 23, 2016.

\* cited by examiner

EVENT PROCESSING IN BACKGROUND SERVICES

TECHNICAL FIELD

The present disclosure relates to computer-implemented methods, software, and systems for robust event processing in background services.

BACKGROUND

A daemon computing process can run as a background process in a multitasking computing system. The daemon process can be started by an operating system rather than as a result of a user input and can run in the background without user intervention. A daemon process can run continually in the background while the operating system is active. A computing system can include multiple running daemon processes, each providing a service.

SUMMARY

The present disclosure involves systems, software, and computer implemented methods for robust event processing in background services. One example method includes: receiving a request to create a daemon session for a background service, the request including at least one start parameter; creating the daemon session in response to the request, including storing the at least one start parameter in a memory storage area that is separate from the daemon session and configured to survive a restart of the daemon session; receiving a set of messages for the daemon session; storing the set of messages in a message queue that is separate from the daemon session and configured to survive a restart of the daemon session; determining, before all messages in the set messages have been processed, that the daemon session is to be restarted; and in response to determining that the daemon session is to be restarted: initiating a restart of the daemon session, including providing the at least one start parameter to the daemon session during the restart of the daemon session; and providing unprocessed messages in the set of messages to the daemon session after the daemon session has been restarted, to enable the daemon session to process the unprocessed messages.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

An application session can send messages to a daemon session to trigger server-based processing in the daemon session. A background service (e.g., a business-related service) can run in the daemon session, for example. A framework can determine that a daemon session is to be restarted (e.g., due to a crash of the daemon session or a planned restart) and automatically restart the daemon session. Start and application parameters and unprocessed messages can be stored by the framework for the daemon session in robust memory storage that is addressable and configured to have a lifetime outside that of the daemon session. Accordingly, upon a restart of the daemon session, the daemon session can retrieve start and application parameters and unprocessed messages from the robust memory storage, for use by the daemon session.

Application sessions, therefore, can send messages that may trigger mission-critical processes (e.g., business processes), knowing that such messages will be processed by the daemon session, even if the daemon session crashes or is restarted. The framework can automatically restart the daemon process if a problem is detected, for example, such as a memory leak. Such robustness provides advantages over other types of background processing, for which when a background process crashes or is restarted, all operating system resources of the process, including queued messages, and possibly the message queue itself, may be lost. These other types of background processes may not include features for automatic reinitialization of background processes. With robust message processing as described herein, applications can be written that might not otherwise have been written, due to a prior concern of lack of reliability or quality of service for a message processor.

With robustness provided by the framework, code for health check tests can be removed from applications, with such health checks no longer needed in the application layer. Removal of health check tests from applications can save developer and runtime resources, such as network, memory, processing, and database loads. The added robustness and the removal of the need for application level health checks can lower total cost of ownership, including reduced maintenance and administration effort. Maintenance tasks can also be improved by enabling planned restarts (e.g., application updates) to happen while enabling applications to continue to send messages to the daemon session while the update takes place.

Figure 1:
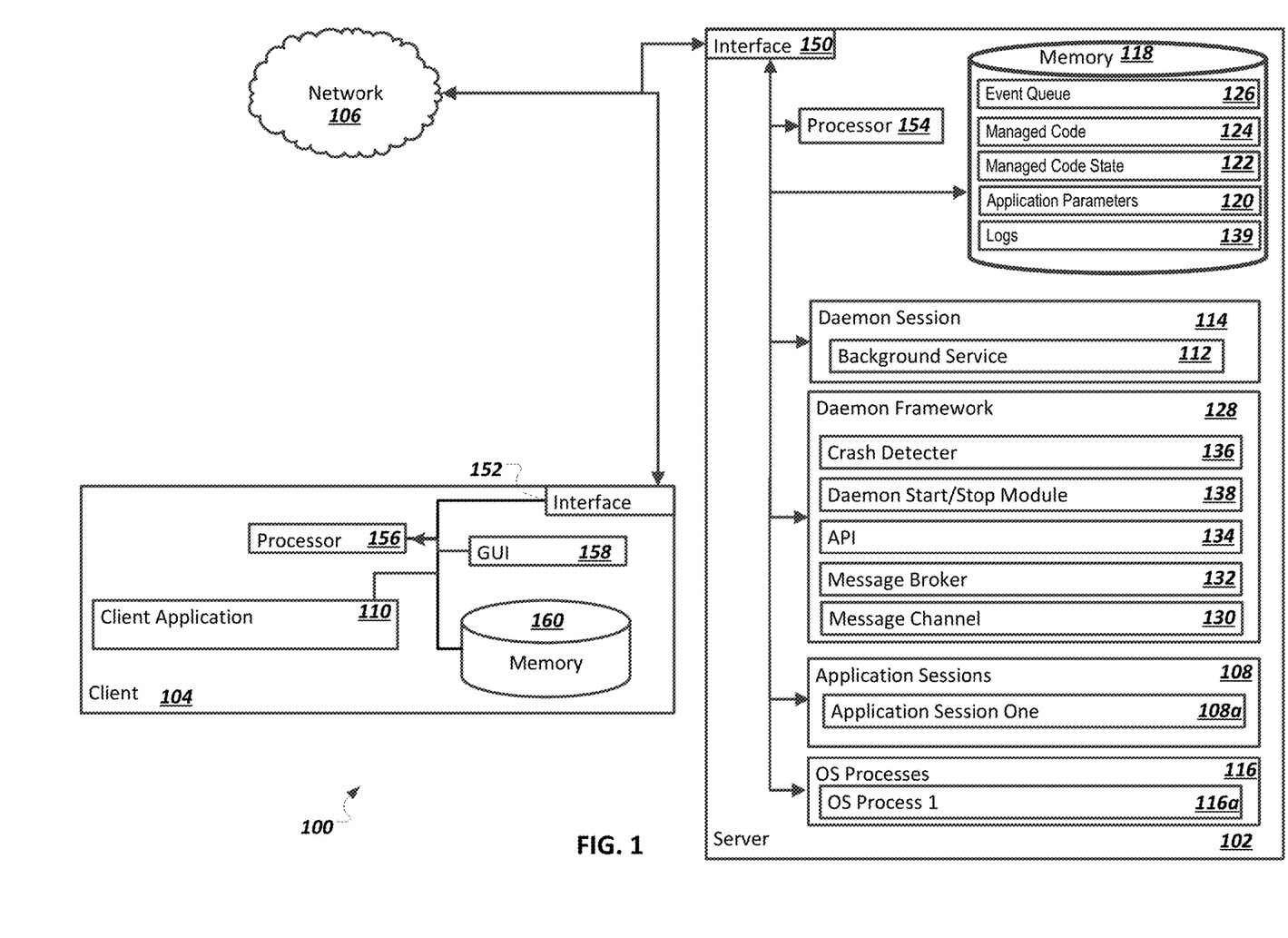
FIG. 1 is a block diagram illustrating an example system for event processing in background services.

FIG. 1 is a block diagram illustrating an example system 100 for robust event processing in background services. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers. For example, although illustrated as a single server 102, the system 100 can include multiple application servers, a database server, a centralized services server, or some other combination of systems or servers. Application sessions 108, including an application session 108*a*, are included in the server 102. In some implementations, different application sessions 108 are included in different application server instances.

Application sessions 108 can be configured to perform application processing in response to client requests, such as from a client application 110 included in the client device 104. The application session 108*a* can be created, for example, in response to a user logon, internally triggered request processing, a stateless HTTP (HyperText Transfer Protocol) call, or some other event. The application session 108*a* can be a container used to support the execution of application processing on the server 102. The application session 108*a* can have a limited lifetime. The application session 108*a* can be deleted, for example, in response to a logoff of a user, the end of the internally triggered request processing, the end of stateless HTTP request handling, a timeout of a stateful HTTP session, or some other event.

Application sessions 108 can be configured to request processing from a background service 112 that runs inside a daemon session 114. As a particular example, application sessions 108 can each be associated with a device in a network of devices (e.g., an IoT (Internet of Things) network). A given application session 108 can send data to the daemon session 114, in response to data received from the associated device, to trigger backend processing related to a particular action or functionality provided by the backend service 112. The daemon session 114 can be a container that is configured to have a lifetime that is longer than the application sessions 108, so that the background service 112 is available to receive and process requests from the application sessions 108. The daemon session 114 can be configured to be robust against crashes, as described below.

Application sessions 108 and the daemon session 114 can each be executed by an operating system (OS) process (e.g., an OS process 116*a* among a plurality of OS processes 116). Application sessions 108 and the daemon session 114 can each be attached and detached from a respective OS process 116. To make the application sessions 108 and the daemon session 114 attachable to different OS processes, data associated with a given session can be stored in shared memory. For example, memory 118 includes an application parameters area 120 and a managed code state area 122. The managed code state area 122 can include runtime state associated with the execution of managed code 124. The managed code 124 can be code for the background service 112, for example. The memory 118 also includes a robust event queue 126, which can be used for robust message processing for the daemon session 114, as described in more detail below.

Application sessions 108 can be configured to send messages to the daemon session 114. A daemon framework 128 can provide a message channel 130 for message sending between the application sessions 108 and the daemon session 114. A message broker 132 can receive messages from the application sessions 108 and store the messages in the event queue 126, to be processed by the background service 112. The background service 112 can implement an ON_MESSAGE callback function provided by an API (Application Programming Interface) 134, for processing of received messages.

Application developers can desire to write applications knowing that message processing by the background service 112 is robust and reliable. The background service 112 can be an operating system process which, like other operating system processes, may be subject to crashing if a runtime error occurs. A crash detector 136 provided by the daemon framework 128 can be configured to detect a crash of the background service 112 and automatically restart the background service 112 for continued execution in the daemon session 114. Crashes and restarts can be logged by the start/stop module 138 in logs 139. A single crash detector 136 may monitor all background services 112, or multiple instances of the crash detector 136 may monitor individual or sets of background services 112.

The event queue 126 may include unprocessed messages for the background service 112 when the background service 112 crashes. As another example, the message broker 132 may receive a message for the background service 112 after the background service 112 has crashed and before the background service 112 has been restarted. The event queue 126 can be configured to be addressable outside of the lifetime of the daemon session 114, so that the event queue 126 is not destroyed or cleared when the background service 112 crashes, and so that the event queue 126 is available to receive and store a message for the daemon session 114 when the daemon session is in the process of but has not finished reinitialization. The background process 112 can retrieve the message from the event queue 126 and process the message, after the daemon session 114 has restarted after enduring a crash.

The background service 112 can implement callback methods (e.g., event handlers) for restart processing and error handling processing, as well as for message processing and start and stop processing. A start/stop module 138 of the daemon framework can request a start or stop of the daemon session 114. The start/stop module 138 can request that the daemon session 114 be stopped (and restarted) if the daemon framework 128 detects a problem with the daemon session 114 (e.g., a memory leak or some other type of problem). The event queue 126 can receive and store a message for the background service 112, during a time window that is after a request to stop the daemon session 114 and before the daemon session 114 has completely restarted. The background process 112 can retrieve the message from the event queue 126 and process the message, after the daemon session 114 has restarted after being stopped.

The start/stop module 138 can be configured to provide information to the daemon session 114 upon startup of the daemon session 114. For example, if the daemon session 114 is being restarted after a crash, a crash reason or other information related to the crash can be provided to the daemon session 114 when the daemon session 114 is restarted. As another example, a start parameter, that includes information to be provided to the background service 112 upon creation of the background service 112 and used by the background service 112 during execution, can be provided to the daemon session 114 upon startup. The start parameter can be stored in the memory 118, such as in the application parameters area 120 or in another robust shared memory area. The background service 112 can be configured to retrieve a start parameter from the shared memory when the daemon session is restarted. The start parameter stored in the shared memory can survive the crash of and have a longer lifetime than the daemon session 114. As another example, the background service 112 can be configured to set one or more other application parameters, during execution of the background service 112, which can be stored in the application parameters 120, for retrieval and use by the background service 112 after a restart of the daemon session 114. The other application parameters stored in the application parameters 120 can survive a crash of and have a longer lifetime than the daemon session 114.

The shared memory areas, including the event queue 126, can ensure that none of data provided during the creation of the daemon session 114, application parameter data stored by the background service 112, and messages in the event queue 126 are lost in the case of an error occurring during execution of the background service 112, providing a robust framework and set of background services 112. The shared memory data and the messages in the event queue can be available once the daemon session 114 is restarted. As described above, such robustness provided by the daemon framework 128 enables application developers to write applications that require reliability and quality of service, without requiring the application developers to implement or test for such reliability and quality of service.

As used in the present disclosure, the term "computer" is intended to encompass any suitable processing device. For example, although FIG. 1 illustrates a single server 102, a single client device 104, and a single external service server 105, the system 100 can be implemented using a single, stand-alone computing device, two or more database systems 102, two or more external service servers 105, or two or more clients 104. Indeed, the server 102, the external service server 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102, the external service server 105, and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the server 102 and the client device 104, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 118. In some implementations, the server 102 includes multiple memories. The memory 118 may include any type of memory or database module and may take the form of volatile and/or non-volatile memory including, without limitation, magnetic media, optical media, random access memory (RAM), read-only memory (ROM), removable media, or any other suitable local or remote memory component. The memory 118 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 156. Each processor 156 included in the client device 104 may be a central processing unit (CPU), an application specific integrated circuit (ASIC), a field-programmable gate array (FPGA), or another suitable component. Generally, each processor 156 included in the client device 104 executes instructions and manipulates data to perform the operations of the client device 104. Specifically, each processor 156 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 158.

The GUI 140 of the client device 104 interfaces with at least a portion of the system 100 for any suitable purpose, including generating a visual representation of the client application 110. In particular, the GUI 158 may be used to view and navigate various Web pages. Generally, the GUI 158 provides the user with an efficient and user-friendly presentation of business data provided by or communicated within the system. The GUI 158 may comprise a plurality of customizable frames or views having interactive fields, pull-down lists, and buttons operated by the user. The GUI 158 contemplates any suitable graphical user interface, such as a combination of a generic web browser, intelligent engine, and command line interface (CLI) that processes information and efficiently presents the results to the user visually.

Memory 160 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 160 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
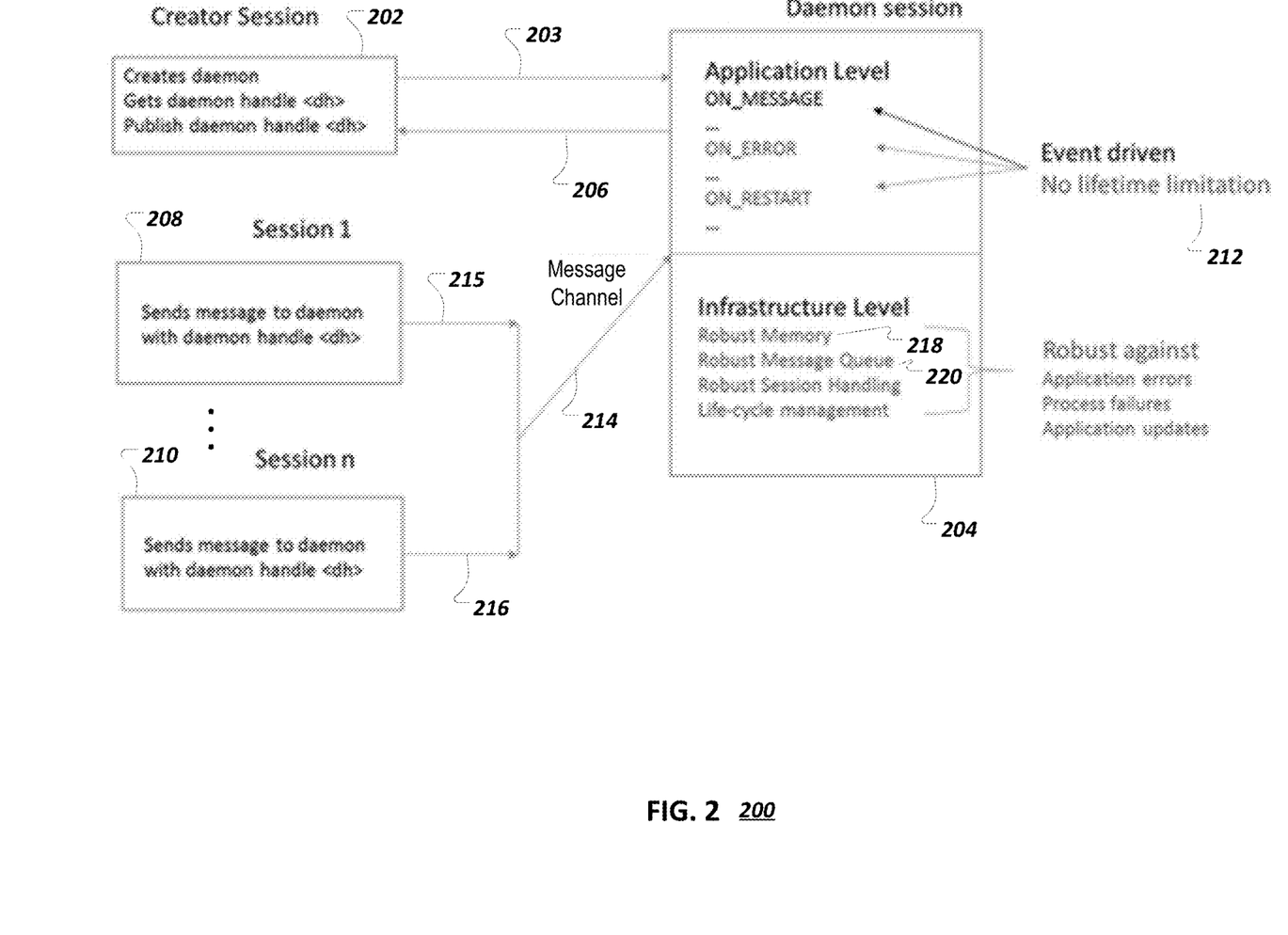
FIG. 2 is a block diagram illustrating an example system for event processing in background services.

FIG. 2 is a block diagram illustrating an example system 200 for robust event processing in background services. A creator session 202 (e.g., a client application session) sends a request 203 (e.g., using an API provided by a framework) to create a daemon session 204. The creator session 202 receives a daemon handle 206 in response to the request 203. The creator session 202 can publish the daemon handle 206 to other application sessions, such as a first session 208 and a second session 210.

The daemon framework provides call back methods that can be implemented by a daemon application (i.e., a background service). In this way, an event-driven API can be provided to implement background services (as indicated by a note 212). Call back methods ON_MESSAGE, ON_ERROR, ON_RESTART, and other methods can be implemented for the daemon session 204 and invoked by the framework in response to associated events (e.g., as described in more detail below with respect to FIGS. 4, 5, and 6). As an example, an ON_MESSAGE method can be invoked for the daemon session 204 in response to receipt by the daemon session 204, through a message channel 214, of a message 215 sent by the first session 208 or a message 216 sent by the second session 210.

In order to provide the mentioned robustness (e.g., during restarts and crashes of the daemon), the daemon framework can use robustness features of the infrastructure of the application server, such as robust memory 218 (e.g., for storing start and application parameters that can survive a crash of the daemon session 204) and a robust message queue 220 that can receive messages even while the daemon session 204 is recovering from a crash. The robust memory 218 and the robust message queue 220 can provide robust session handling and lifecycle management that can make the daemon session 204 robust against application errors, process failures, and application updates.

Figure 3:
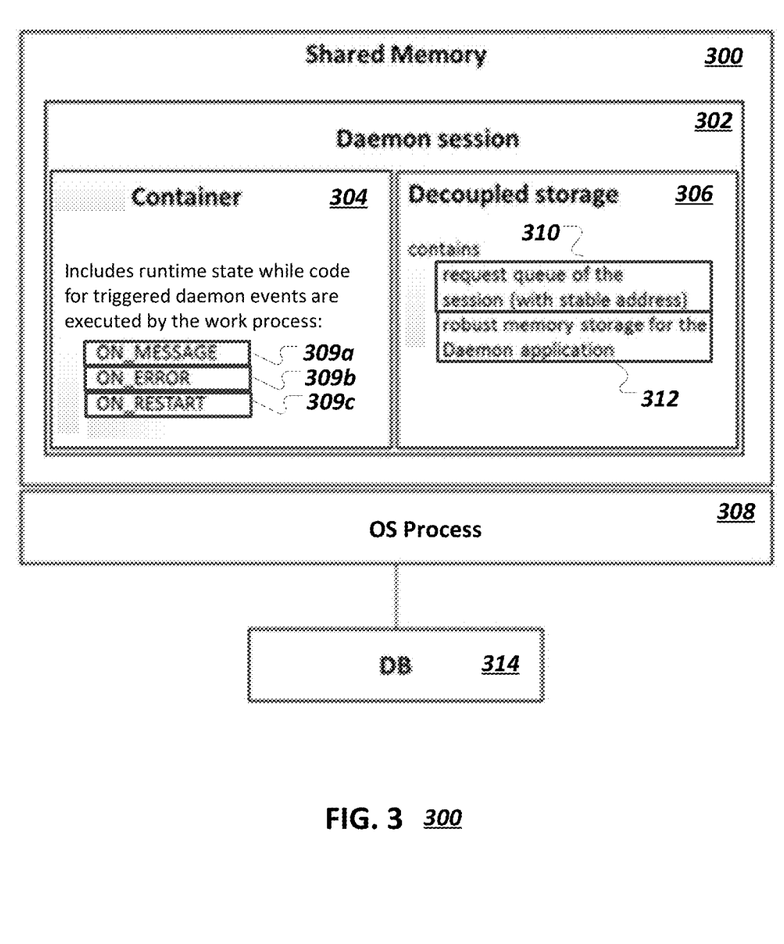
FIG. 3 illustrates shared memory used by daemon sessions.

FIG. 3 illustrates shared memory 300 used by daemon sessions. The shared memory 300 can store information for a daemon session 302. The shared memory 300 includes a container area 304 and decoupled storage 306 for the daemon session 302. The container area 304 can include runtime state while an OS process 308 executes message handling and other methods for the daemon session 302, such as runtime state 309a, 309b, and 309c for ON_MESSAGE, ON_ERROR, and ON_RESTART methods, respectively.

The decoupled storage 306 includes a request queue 310 for the daemon session 302. The request queue 310 has a stable address that is valid even when the daemon session 302 has crashed and is in the process of restarting. A client can send a message to a daemon application associated with the daemon session 302 during a time window that is after the daemon session 302 has crashed and before the daemon session has restarted. The message can be received (e.g., by a framework), placed in the request queue 310, and processed by the daemon application after the daemon session has completed restart and error handling processes.

The decoupled storage 306 includes memory storage 312 for the daemon application. The memory storage 312 can be used to store start and/or application parameters that can survive a crash of the daemon application. A start parameter can be received by the daemon application (e.g., from a client) when the daemon session is started, and stored in the memory storage 312 (e.g., either by the daemon application or the framework). The daemon application can set one or more application parameters (in the memory storage 312) during execution of the daemon application. The daemon application can retrieve start and/or application parameters from the memory 312 when the daemon application is executing an ON_ERROR method after a crash of the daemon application or when the daemon application is executing an ON_RESTART method after a planned restart of the daemon application. Execution of ON_ERROR or ON_RESTART can restore application state that is represented by the retrieved start and/or application parameters. The data in the memory storage 312 can have a lifetime that is longer than the daemon application (e.g. if the daemon application crashes), with the longer data lifetime being similar to persistent data that is stored in a database 314.

Figure 4:
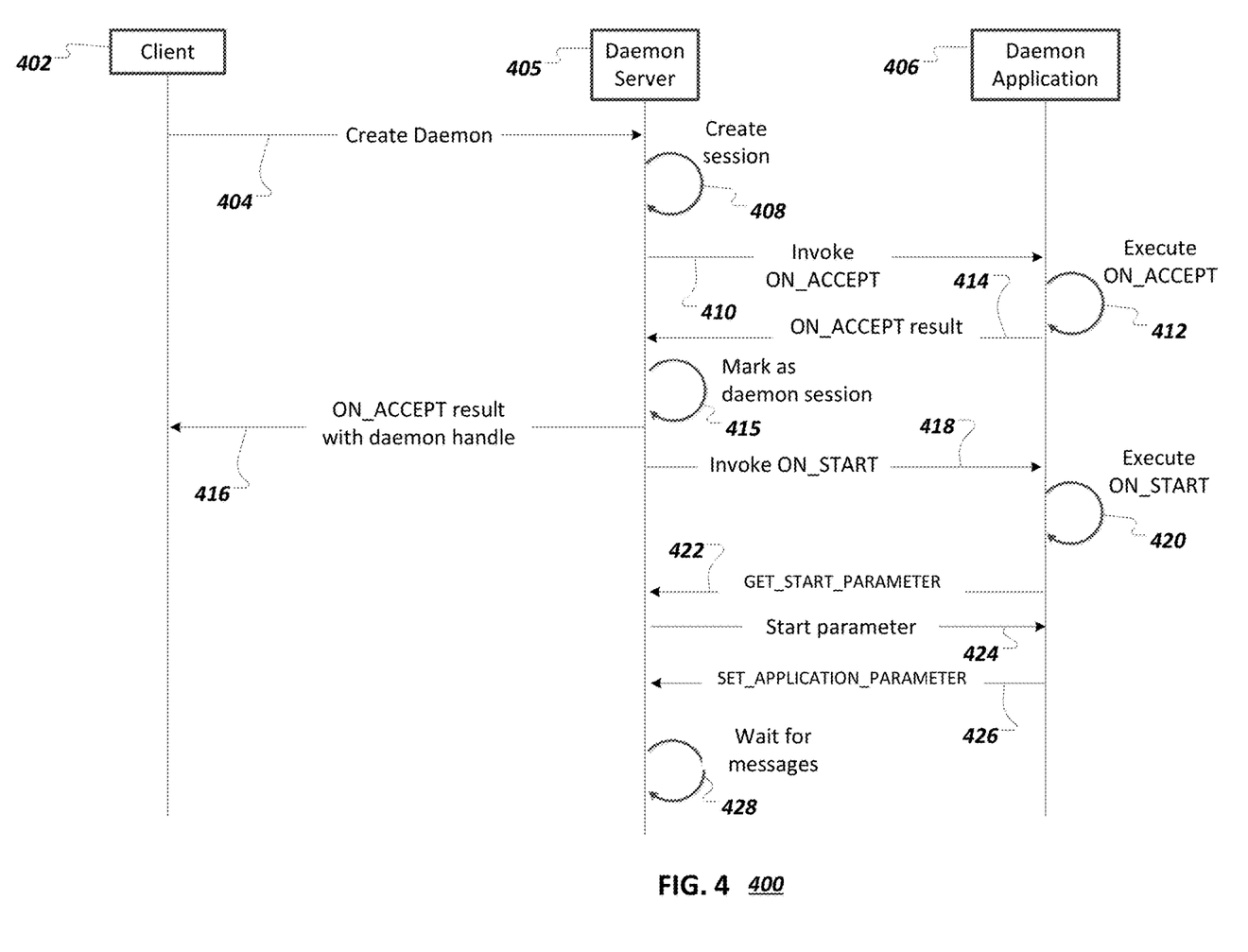
FIG. 4 is a flowchart of an example method for creating a daemon session.

FIG. 4 is a flowchart of an example method 400 for creating a daemon session. A client 402 sends a create daemon message 404 to a daemon server 405, for creation of a daemon session for a daemon application 406. The daemon server 405 creates a session (408) for the daemon application 406. Creating the session can include storing one or more start parameters received from the client 402 in shared memory that is separate from the daemon application 406.

The daemon server 405 instructs the daemon application 406 to invoke an ON_ACCEPT method of the daemon application 406 (410). The daemon application 406 can, when determining to accept the request, execute the ON_ACCEPT method (412) and sends a result 414 of the execution to the daemon server 405. The daemon server 4-5 can, in response to receiving the ON_ACCEPT result 414, mark the created session as a daemon session and determine a daemon handle for the daemon session (415). The daemon server 405 forwards the result 414 as an ON_ACCEPT result 416 to the client 402. The ON_ACCEPT result 416 can include a daemon handle that can be used for future message sending requests sent from the client 402 to the daemon server 405, for the daemon application 406.

The daemon server 405 instructs the daemon application 408 to invoke an ON_START method of the daemon application 406 (418). The daemon application 406 executes the ON_START method (420). Executing the ON_START method can include the daemon application 406 executing a GET_START_PARAMETER method 422, which can be used to retrieve a start parameter from the shared memory configured for the daemon application 406. The daemon server 405 can retrieve the start parameter from the shared memory and provide a start parameter 424 to the daemon application 406.

Executing the ON_START method can also include the daemon application 406 executing a SET_APPLICATION_PARAMETER method 426, which can be used to store an application parameter in the shared memory. The application parameter can survive a crash of the daemon application 406. That is, the daemon application 406 can retrieve the application parameter after the daemon application 406 is restarted after crashing. After the daemon application 406 is initialized, the daemon server 405 can be configured to wait for messages to be provided to the daemon application 406 by one or more clients (428), as described below.

Figure 5:
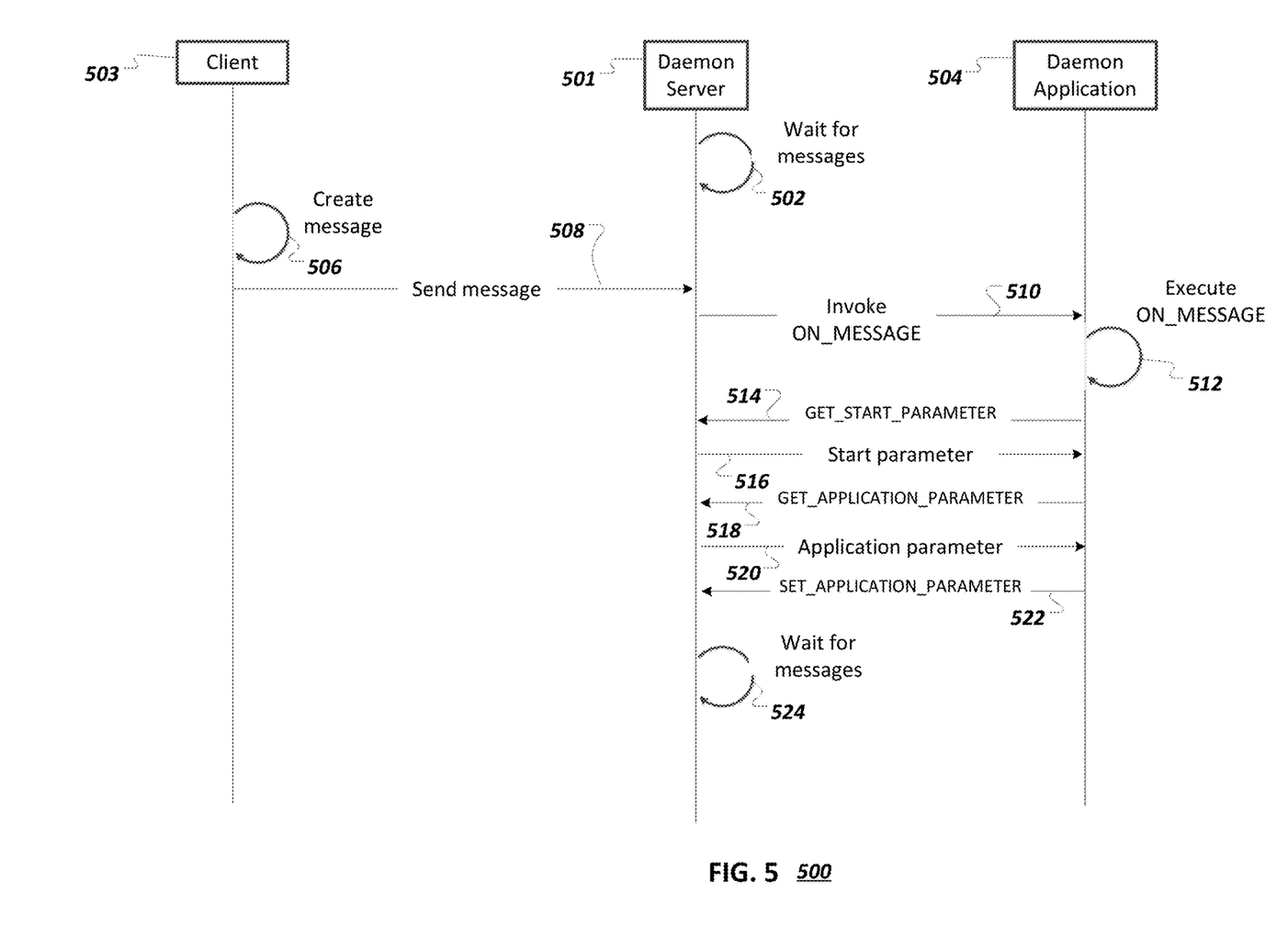
FIG. 5 is a flowchart of an example method for message processing in a daemon session.

FIG. 5 is a flowchart of an example method 500 for message processing in a daemon session. A daemon server 501 is configured to wait for messages from client applications (502). A client 503 creates a message for sending to a daemon application 504 (506). The client 503 sends a created message 508 to the daemon server 501. The created message 508 can include or be otherwise associated with a daemon handle associated with the daemon application 504. In response to receipt of the created message 508, the daemon server 501 instructs the daemon application 504 to invoke an ON_MESSAGE method of the daemon application 504 to process the received message (510). The daemon application 504 executes the ON_MESSAGE method (512). Executing the ON_MESSAGE method can include the daemon application 504 executing a GET_START_PARAMETER method 514, which can be used to retrieve a start parameter from shared memory configured for the daemon application 504.

The daemon server 501 can retrieve the start parameter from the shared memory and provide a retrieved start parameter 516 to the daemon application 504. Executing the ON_MESSAGE method can include one or both of the daemon application 504 getting or setting application parameters. For example, the daemon application 504 can invoke a GET__APPLICATION_PARAMETER method 518 and can receive an application parameter 520 from the daemon server 501 (after the daemon server 501 retrieves the application parameter 520). As another example, the daemon application 504 can invoke a SET_APPLICATION_PARAMETER method 522 to set an application parameter that can have a lifetime beyond a crash of the daemon application 504. After the daemon server 501 has received the message 508, the daemon server 501 waits for other messages from the client 503 or other clients.

Figure 6:
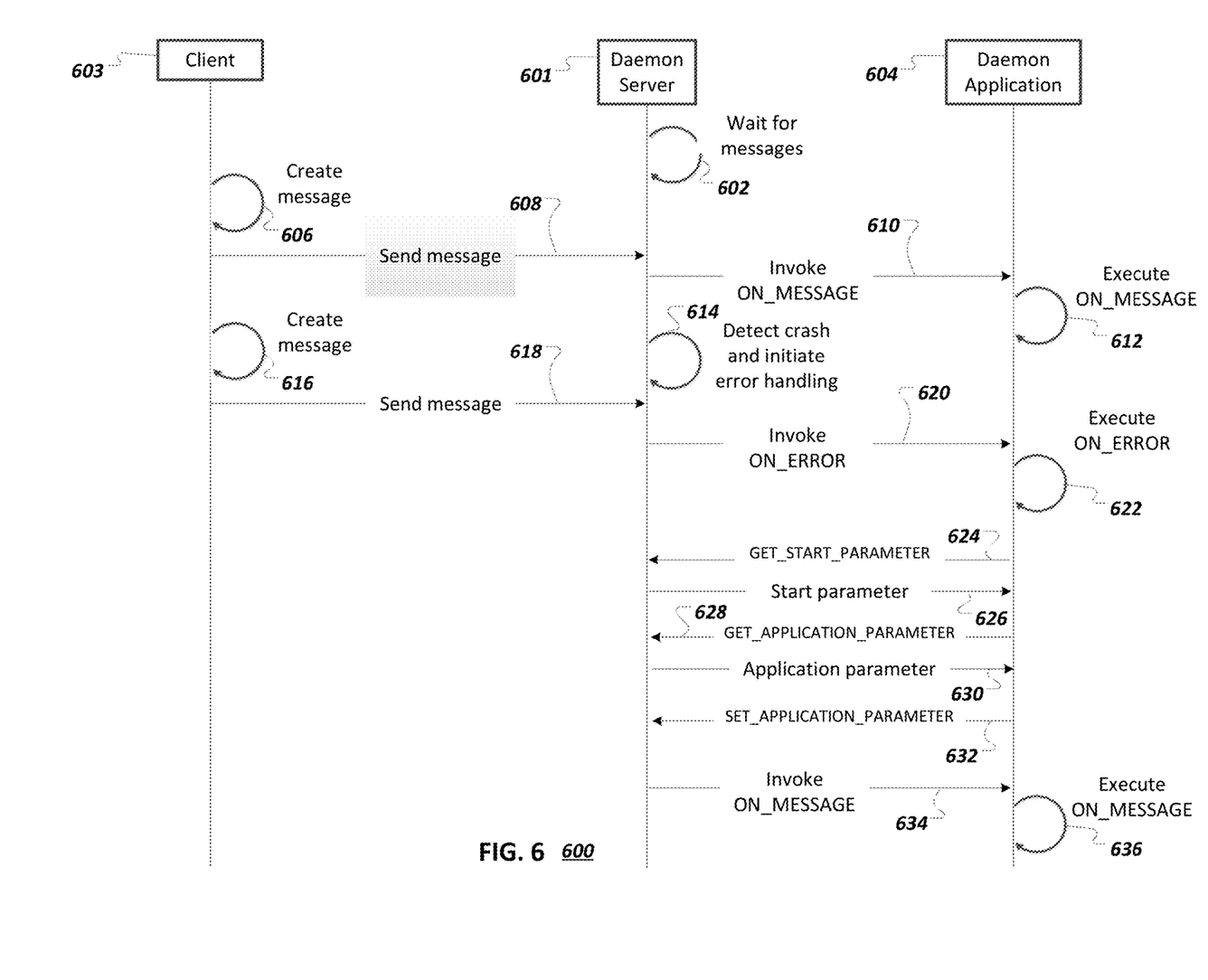
FIG. 6 is a flowchart of an example method for error handling in a daemon session.

FIG. 6 is a flowchart of an example method 600 for error handling in a daemon session. A daemon server 601 is configured to wait for messages from client applications (602). A client 603 creates a message for sending to a daemon application 604 (606). The client 603 sends a created message 608 to the daemon server 601. The daemon server 601 instructs the daemon application 604 to invoke an ON_MESSAGE method of the daemon application 604 to process the received message (610). The daemon application executes the ON_MESSAGE method (612).

An error can occur during processing of the message 608 in the ON_MESSAGE method that causes the daemon application 604 to crash. Or an error can otherwise occur in the daemon application 604 before the processing of the message 608 has been completed. The daemon server 601 can detect that the daemon application 604 has crashed and can initiate error handling to recover from the crash (614), including, as part of error handling, initiating a restarting of the daemon application 604.

After the crash and before the daemon application 604 has been restarted, the client 603 can create a second message (616) and send the second message 618 to the daemon server 601. The daemon server 601 can store the second message 608 in a robust message queue for the daemon application 604 that is separate from and survives the crash of the daemon application 604.

After the daemon application 604 has been restarted, the daemon server 601 can instruct the daemon application 604 to invoke an ON_ERROR method 620, and in response, the daemon application 604 can execute the ON_ERROR method (622). The daemon application 604 can execute the ON_ERROR method to recover from the crash. For example, the daemon application can execute a GET_START_PARAMETER method 624 to retrieve a start parameter from shared memory that survived the crash of the daemon application 604. The daemon server 601 can retrieve and provide a start parameter 626 to the daemon application 604.

Executing the ON_ERROR method for error recovery can include one or both of the daemon application 604 getting or setting application parameters. For example, the daemon application 604 can invoke a GET_APPLICATION_PARAMETER method 628 and can receive an application parameter 630 from the daemon server 601 (after the daemon server 601 retrieves the application parameter 630). Application parameters can represent application state, and can be stored in shared memory that is separate from and survives a crash of the daemon application 604. As another example, the daemon application 604 can invoke a SET_APPLICATION_PARAMETER method 632 to set an application parameter, as part of error handling.

After the daemon application has recovered from the crash, the daemon server 601 can instruct the daemon application 604 to invoke an ON_MESSAGE method 634 to process the message 618 that had been sent after the crash of the daemon application 604 and before the daemon application 604 had been restarted. The message 618 can be included in a message queue that survives the crash of the daemon application 604, for example. The daemon application 604 processes the message 608 by executing the ON_MESSAGE method (636).

Figure 7:
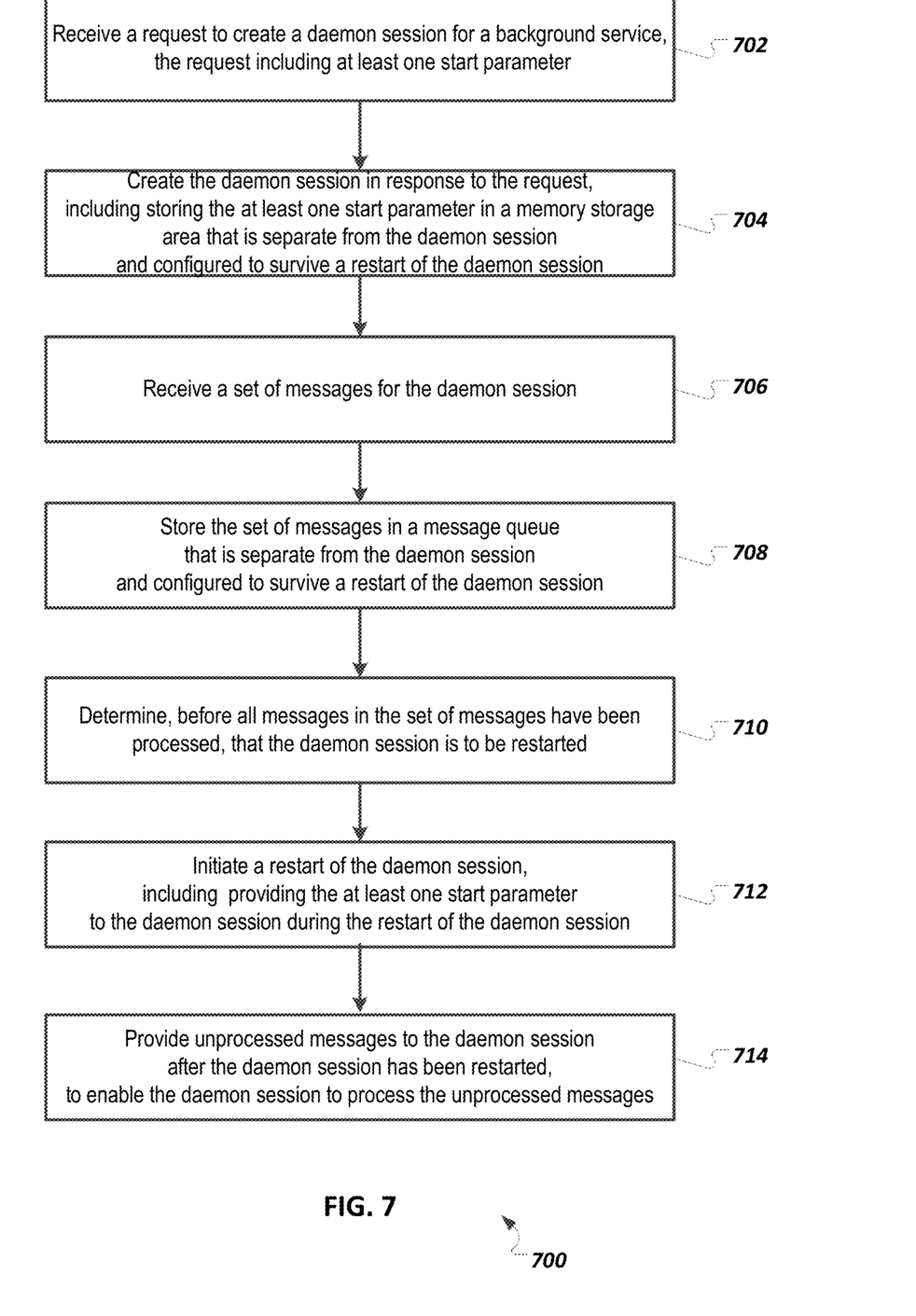
FIG. 7 is a flowchart of an example method for event processing in background services.

FIG. 7 is a flowchart of an example method 700 for event processing in background services. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by daemon framework 128 of FIG. 1.

At 702, a request to create a daemon session for a background service is received. The request includes at least one start parameter. The start parameter can be information that a sender of the request wants to provide to the daemon session. The sender can be an application session, for example. The background service can run managed code. The background service can be an application to be run in the daemon session.

At 704, the daemon session is created in response to the request. The at least one start parameter can be stored in a memory storage area that is separate from the daemon session and configured to survive a crash of the daemon session. The memory storage area can be in shared memory that is separate from a memory area used to store runtime state of the daemon session.

At 706, a set of one or more messages is received for the daemon session. The set of messages can be received using a message channel. The set of messages can be received from one or more application sessions.

At 708, each message in the set of messages is stored in a message queue that is separate from the daemon session and configured to survive a restart of the daemon session. The message queue can be in shared memory that is separate from the memory area used to store runtime state of the daemon session.

At 710, a determination is made, before all messages in the set of messages have been processed, that the daemon session is to be restarted. For example, a crash of the daemon session can be detected. As another example a determination can be made that application code for the background service is to be (or has been) updated. As yet another example, a determination can be made that the background service has used more than a threshold amount of memory (or that some other problem has been or is occurring with the background service).

At 712, in response to determining that the daemon session is to be restarted, a restart of the daemon session is initiated. The at least one start parameter can be provided to the daemon session during the restart of the daemon session. Initiating the restart of the daemon session can include providing information about the restart (e.g., a reason for a crash, or a reason for a planned restart) to the daemon session. An application parameter that has been stored in the memory storage area by the daemon session can be provided to the daemon session when the daemon session is restarted). A new message can be received for the daemon session after the restart has been initiated and before the daemon session has been completely restarted. The new message can be stored in the event queue.

At 714, the unprocessed messages in the set of messages are provided to the daemon session after the daemon session has been restarted, to enable the daemon session to process the unprocessed messages. The unprocessed messages in the set of messages can be retrieved from the message queue that has survived the restart of the daemon session. The new message can also be provided to the daemon session after the daemon session has been restarted, to enable the daemon session to process the new message.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
   receiving a request to create a daemon session for a background service, the request including at least one start parameter;
   creating the daemon session in response to the request, including storing the at least one start parameter in a memory storage area that is separate from the daemon session and configured to survive a restart of the daemon session;
   receiving a set of messages for the daemon session;
   storing the set of messages in a message queue that is separate from the daemon session and configured to survive a restart of the daemon session;
   determining, before all messages in the set messages have been processed, that the daemon session is to be restarted; and
   in response to determining that the daemon session is to be restarted:
      initiating a restart of the daemon session, including providing the at least one start parameter to the daemon session during the restart of the daemon session; and
      providing unprocessed messages in the set of messages to the daemon session after the daemon session has been restarted, to enable the daemon session to process the unprocessed messages.

2. The method of claim 1, wherein determining that the daemon session is to be restarted comprises detecting a crash of the daemon session.

3. The method of claim 1, wherein determining that the daemon session is to be restarted comprises determining that application code for the background service is to be updated.

4. The method of claim 1, wherein determining that the daemon session is to be restarted comprises determining that the background service has used more than a threshold amount of memory.

5. The method of claim 1, further comprising:
   receiving a request to store at least one application parameter;
   storing the at least one application parameter in the memory storage area so that the at least one application parameter is available to the daemon session after a restart of the daemon session; and further in response to determining that the daemon session is to be restarted, providing the at least one application parameter to the daemon session after the restart of the daemon session.

6. The method of claim 1, wherein the memory storage area resides in shared memory.

7. The method of claim 1, wherein the message queue resides in shared memory.

8. The method of claim 1, wherein initiating a restart of the daemon session comprises providing information about the restart to the daemon session.

9. The method of claim 1, further comprising:
receiving a new message for the daemon session after initiating the restart of the daemon session and before the restart of the daemon session has been completed;
storing the new message in the event queue; and
providing the new message to the daemon session after the daemon session has been restarted, to enable the daemon session to process the new message.

10. The method of claim 1, wherein the background service runs managed code.

11. The method of claim 10, wherein state of the managed code is stored in shared memory separate from the memory storage area and the event queue.

12. The method of claim 1, wherein the memory storage area and the event queue survive the restart of the daemon session by being available to other processes before, during, and after the restart of the daemon session.

13. A system, comprising:
at least one processor; and
a memory communicatively coupled to the at least one processor, the memory storing instructions which, when executed by the at least one processor, cause the at least one processor to perform operations comprising:
receiving a request to create a daemon session for a background service, the request including at least one start parameter;
creating the daemon session in response to the request, including storing the at least one start parameter in a memory storage area that is separate from the daemon session and configured to survive a restart of the daemon session;
receiving a set of messages for the daemon session;
storing the set of messages in a message queue that is separate from the daemon session and configured to survive a restart of the daemon session;
determining, before all messages in the set messages have been processed, that the daemon session is to be restarted; and
in response to determining that the daemon session is to be restarted:
initiating a restart of the daemon session, including providing the at least one start parameter to the daemon session during the restart of the daemon session; and providing unprocessed messages in the set of messages to the daemon session after the daemon session has been restarted, to enable the daemon session to process the unprocessed messages.

14. The system of claim 13, wherein determining that the daemon session is to be restarted comprises detecting a crash of the daemon session.

15. The system of claim 13, wherein determining that the daemon session is to be restarted comprises determining that application code for the background service is to be updated.

16. The system of claim 13, wherein determining that the daemon session is to be restarted comprises determining that the background service has used more than a threshold amount of memory.

17. One or more non-transitory computer-readable media storing instructions which, when executed by at least one processor, cause the at least one processor to perform operations comprising:
receiving a request to create a daemon session for a background service, the request including at least one start parameter;
creating the daemon session in response to the request, including storing the at least one start parameter in a memory storage area that is separate from the daemon session and configured to survive a restart of the daemon session;
receiving a set of messages for the daemon session;
storing the set of messages in a message queue that is separate from the daemon session and configured to survive a restart of the daemon session;
determining, before all messages in the set messages have been processed, that the daemon session is to be restarted; and
in response to determining that the daemon session is to be restarted:
initiating a restart of the daemon session, including providing the at least one start parameter to the daemon session during the restart of the daemon session; and
providing unprocessed messages in the set of messages to the daemon session after the daemon session has been restarted, to enable the daemon session to process the unprocessed messages.

18. The computer-readable media of claim 17, wherein determining that the daemon session is to be restarted comprises detecting a crash of the daemon session.

19. The computer-readable media of claim 17, wherein determining that the daemon session is to be restarted comprises determining that application code for the background service is to be updated.

20. The computer-readable media of claim 17, wherein determining that the daemon session is to be restarted comprises determining that the background service has used more than a threshold amount of memory.

* * * * *